Patented July 14, 1942

2,289,599

UNITED STATES PATENT OFFICE 2,289,599

AMINO-ACID ESTER SALTS OF PHENOLS

Frank B. Smith and John N. Hansen, Midland, Mich., assignors to The Dow Chemical Company, Midland, Mich., a corporation of Michigan No Drawing. Application May 31, 1940, Serial No. 338,044

18 Claims. (Cl. 260—482)

This invention relates to the amino-acid ester salts of phenols. We have prepared representative members of this group of compounds and found them for the most part to be crystalline solids, stable to light and air, and not appreciably affected by carbon dioxide. They are valuable as insecticides, fungicides, bactericides, and as intermediates.

The new compounds are prepared by reacting an amino-acid ester, such as the phenyl ester of glycine, ethyl ester of alanine, or amyl ester of tyrosine, with a phenol to form the addition salt. The reaction may be carried out conveniently by contacting solutions of the two reactants in benzene or other suitable solvent. Substantially equimolecular proportions of the phenol and amino-acid ester have been found to give the desired salts in good yield, although any suitable amounts may be employed. Where an excess of one or another of the reactants is present in the final product, separation is readily accomplished by extraction with benzene or other solvent, in which the reactants are more soluble than is the desired phenolate product. The reaction can be carried out at any desired temperature up to the refluxing temperature of the reaction mixture, although reduced amounts of solvent are required at temperatures between about 40° and 120° C., under which conditions the solubility of the amine and phenol in the reaction solvent is relatively high. On addition of the amino-acid ester to the phenol solution, the insoluble addition salt of the phenol begins to precipitate or separate out of the mixture. The formation of such salt is generally complete within about one hour after the reactants are combined. To insure the formation of a relatively homogeneous product and to minimize occlusion, the amino-acid ester solution is preferably added portion-wise to the reaction mixture with stirring over a short period of time. This also permits a closer control of the reaction temperature since appreciable heat of reaction is developed. Following completion of the reaction, the mixture is filtered or otherwise manipulated to separate out the insoluble amino-acid ester salt of the phenol, which may be further purified by washing with small amounts of such solvents as benzene, chlorobenzene, and the like. The addition salt obtained as a residue from the separation is then dried at a temperature calculated to volatilize residual traces of solvent, and may subsequently be recrystallized if desired.

In an alternate procedure, amino-acid ester hydrochloride may be reacted with a solution of a water-soluble alkali metal phenolate in aqueous solution, whereby the addition salt of the phenol precipitates from the solution and may be separated in the usual manner.

A convenient method of operation, whereby the amino-acid ester or its hydrochloride is readily obtained, comprises dissolving an amino-acid hydrochloride and a suitable hydroxyl-containing organic compound such as an alcohol or phenol in benzene or other solvent and thereafter heating the mixture to its refluxing temperature while passing gaseous hydrogen chloride through the reaction mixture. This results in the formation of the amino-acid ester hydrochloride. The mixture may then be blown with ammonia gas to liberate the free amino-acid ester base. The ammonium chloride formed in this step is filtered off and excess ammonia removed by blowing the filtrate with air. The resulting benzene solution of the free amino-acid ester compound is adapted to be employed in the preparation of addition salts of phenols as herein set forth. When, as is sometimes convenient, a molecular excess of the alcohol or phenol is used in preparing the ester, the unreacted portions thereof may be separated by fractionally distilling the mixture to remove both solvent and excess of hydroxy compound to leave a residue of the amino-acid ester hydrochloride.

While this invention is concerned with the amino-acid ester salts of phenols generally, it is particularly directed to the reaction products obtained by the addition of amino-acid esters to certain mono-nitro and di-nitro monohydric phenols. The compounds of this class which have been found particularly valuable for insecticidal and fungicidal use are those having the following formula

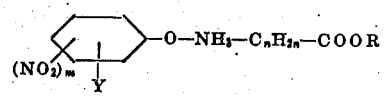

wherein $n$ is a integer, $m$ is an integer not greater than 2, R represents a hydrocarbon radical, and Y represents a radical selected from the group consisting of aryl, alkyl, cycloalkyl, aralkyl, chlorine, bromine, arylamino, and hydrogen. These compounds are difficultly soluble, high-melting, crystalline solids, which are yellow to orange-red in color.

A further line of distinction is appreciated as to the existence of a subgeneric group of compounds which have an extremely low solubility in water. These compounds have the following formula

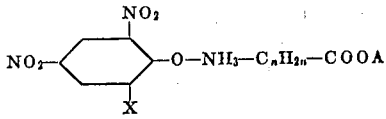

wherein $n$ is a integer, A represents a non-benzenoid hydrocarbon radical, such as alkyl or cycloalkyl, and X is a saturated hydrocarbon radical containing at least two carbon atoms. Compounds falling within this formula have been found to have a solubility in water of less than 0.2 gram per 100 milliliters at 25° C. This characteristic is of particular value since in use as insecticidal toxicants it has been found that the burning and other injury commonly resulting from the application of dinitro phenols and their salts to living plants is largely dependent upon the degree to which such compounds are soluble in water. This is of importance in the use of aqueous sprays, and in the maintenance of toxicant residues on tree surfaces which may be contacted with rain or dew. The characteristic of low water solubility for a nitro phenolic insecticidal toxicant is recognized as being very desirable.

Of the amino-acid ester compounds which may be employed in the present reaction, those having the general formula $H_2N—C_nH_{2n}—COOR$ wherein $n$ is an integer and R represents a hydrocarbon radical, constitute a preferred class, due both to their availability, relative cheapness of manufacture, and the desirable insecticidal properties of addition salts thereof with the phenols.

The following examples set forth certain embodiments of the invention but are not to be construed as limiting the same:

*Example 1*

20.8 grams (0.112 mole) of glycine cyclohexyl ester hydrochloride was dissolved in 50 grams of benzene and ammonia gas passed through the mixture to liberate the free ester. The mixture was then blown with air to remove excess ammonia and filtered to remove ammonium chloride formed in the reaction. The resulting benzene solution of glycine cyclohexyl ester was added portion-wise with stirring to a boiling solution of 26.2 grams (0.1 mole) of 2-cyclohexyl-4.6-dinitro phenol in benzene. The glycine cyclohexyl ester addition salt precipitated out of solution as formed, the reaction being substantially complete within 30 minutes of completion of the addition of the glycine cyclohexyl ester solution. The mixture was thereafter cooled to room temperature and filtered, the residue being washed with benzene to remove traces of the free phenol and amine and thereafter dried, whereby there was obtained 19 grams of glycine cyclohexyl ester salt of 2-cyclohexyl-4.6-dinitro phenol as yellow crystals melting at 153° C. The solubility of this compound in water at 25° C. was 0.0076 gram per 100 milliliters. The saturated water solution of the salt had a pH of 6.3.

*Example 2*

In a similar manner 53.3 grams (0.2 mole) of pentachloro phenol dissolved in benzene was reacted with glycine ethyl ester obtained by treating a benzene solution of 27.8 grams (0.2 mole) of glycine ethyl ester hydrochloride with ammonia gas. The reaction was carried out at the boiling temperature of the reaction mixture and under reflux. The resulting precipitate was separated by filtration, washed with benzene and dried whereby there was obtained 56.5 grams of the glycine ethyl ester salt of pentachloro phenol as a white crystalline product melting at 163°–4° C. and having a water solubility of 0.098 gram per 100 milliliters at 25° C. A saturated water solution of this compound had a pH of 6.8.

Other amino-acid ester addition salts of phenols which can be prepared in a similar manner include the following:

Glycine n-hexyl ester salt of 2-cyclohexyl-4.6-dinitro phenol as a yellow crystalline product melting at 120°–1° C. and soluble to the extent of 0.0083 gram in 100 milliliters of water at 25° C. A saturated aqueous solution of this product has a pH of 6.33.

Glycine ethyl ester salt of 2-cyclohexyl-4.6-dinitro phenol as a yellow crystalline product melting at 145°–6° C. and having a solubility of 0.0408 gram per 100 milliliters of water at 25° C. A saturated aqueous solution of this compound has a pH of 6.9.

Glycine ethyl ester salt of 2-chloro-4.6-dinitro phenol as a yellow crystalline material melting at 160°–1° C. and having a solubility of 0.575 gram per 100 milliliters of water. A saturated aqueous solution has a pH of 3.85.

Glycine ethyl ester salt of 2-chloro-4-nitro phenol as a yellow crystalline product melting at 103°–5° C. and soluble in water to the extent of 4.07 grams per 100 milliliters. A saturated aqueous solution of this compound has a pH of 6.2.

Glycine ethyl ester salt of 2-methyl-4.6-dinitro phenol in the form of yellow crystals melting at 140° C. and having a water solubility of 0.696 gram in 100 milliliters of water at 25° C. A saturated water solution of this compound has a pH of 5.9.

Glycine ethyl ester salt of 2-n-hexyl-4.6-dinitro phenol as a yellow crystalline compound melting at 103°–4.5° C. and having a water solubility of 0.124 gram per 100 milliliters at 25° C. A saturated aqueous solution of this compound has a pH of 7.0.

Glycine ethyl ester salt of 2.4-dinitro phenol as a yellow crystalline compound melting at 131°–2° C. and soluble in water to the extent of 2.85 grams per 100 milliliters at 25° C. A saturated water solution of this salt has a pH of 5.9.

Glycine ethyl ester salt of 2-phenyl-4.6-dinitro phenol as a yellow salt melting at 151°–3° C. This compound is soluble in water to the extent of 0.12 gram per 100 milliliters at 25° C. A saturated water solution has a pH of 6.9.

Glycine cyclohexyl ester salt of 2-chloro-4.6-dinitro phenol as a yellow crystalline compound melting at 203° C. This compound is soluble in water to the extent of 0.103 gram per 100 milliliters at 25° C. A saturated water solution has a pH of 6.3.

Glycine n-hexyl ester salt of 2.4-dinitro phenol as a yellow crystalline compound melting at 86°–7° C. and soluble in water to the extent of 0.285 gram per 100 milliliters at 25° C. A saturated water solution of this compound has a pH of 5.25.

Glycine n-hexyl ester salt of 2-phenyl-4.6-dinitro phenol as a yellow crystalline compound melting at 131°–2° C. and soluble in water to the extent of 0.0167 gram per 100 milliliters at 25° C. A saturated aqueous solution of this compound has a pH of 6.4.

Glycine ethyl ester as employed in the preparation of certain of the foregoing compounds was prepared by reacting together substantially equimolecular proportions of glycine and absolute ethyl alcohol in the presence of an excess of dry hydrogen chloride at the boiling temperature of the mixture and under reflux. After completion of the reaction, the mixture was cooled whereupon the hydrochloride of glycine ethyl ester separated out in the form of white crystals. The mixture was filtered and the residue washed and dried to obtain a compound having a melting point of 143°–4° C. This compound was adapted to be employed without further treatment as disclosed in Example 1. The glycine-n-hexyl ester was prepared by heating 2 moles of glycine with 8 moles of n-hexanol in the presence of dry hydrogen chloride at temperatures ranging between 113° and 118° C. for a period of 8 hours. After completion of the reaction the mixture was fractionally distilled under reduced pressure to remove excesses of n-hexanol. The residue obtained from this fractionation is glycine-n-hexyl ester hydrochloride adapted to be employed in the preparation of phenolates substantially as set forth in the examples.

In similar manner glycine cyclohexyl ester was prepared by heating glycine with an excess of cyclohexanol in the presence of hydrogen chloride at temperatures gradually increasing from 70° to 120° C. for a period of 8½ hours. A total of 12.5 milliliters of water was separated from the reaction zone during the reaction. The reacted mixture was then fractionally distilled to remove unreacted cyclohexanol and the viscous liquid residue, consisting essentially of glycine cyclohexyl ester hydrochloride, employed as a reactant in the preparation of phenolic addition salts.

Other phenols which may be substituted for those set forth above include phenol, 4-chlorophenol, 2.5-dichloro phenol, 2.4.6-trichloro phenol, 2-phenyl phenol, 3-cyclohexyl phenol, alpha naphthol, dinitro-alpha naphthol, 4-benzyl phenol, 2.4-dinitro-5-cyclohexyl phenol, 2.4-dinitro-octadecyl phenol, 2.4.6-trinitro-5-cyclohexyl phenol, 2.4-dinitro-6-benzyl phenol, 2.5-dinitro-4-cyclohexyl phenol, 2-brom-4.6-dinitro phenol, 2.4-dinitro-5-naphthyl-amino-phenol, 2.4-dinitro-5-anilino phenol, 4-tertiary-butyl phenol, 4-octadecyl phenol, 4-tertiary-octyl phenol, 2-methyl-4-tertiary-butyl phenol, guaiacol, thymol, carvacrol, and the like. Similarly other amino acid esters may be employed in the reaction, e. g. alanine methyl ester, alanine ethyl ester. leucine ethyl ester, isoleucine ethyl ester, tyrosine amyl ester, tyrosine ethyl ester, tyrosine octyl ester, tyrosine palmityl ester, tyrosine glyceryl ester, glycine propyl ester, glycine isopropyl ester, glycine isobutyl ester, glycine-n-butyl ester, glycine amyl ester, glycine isoamyl ester, glycine benzyl ester, glycine xenyl ester, and glycine phenyl ester.

A copending application Serial No. 338,043, filed concurrently herewith, claims parasiticidal compositions comprising the amino-acid ester salts of phenols as herein described.

Other modes of applying the principle of our invention may be employed instead of those explained, change being made as regards the materials employed, provided the products described in the following claims be thereby obtained.

We therefore particularly point out and distinctly claim as our invention:

1. An addition salt of an amino-acid ester and a phenol.
2. An addition salt of a glycine ester and a phenol.
3. An addition salt of an amino-acid ester and a monohydric phenol.
4. An addition salt of an amino-acid ester and a nitrated monohydric phenol.
5. An addition salt of an amino-acid ester and a nitrated monohydric phenol in which not more than 2 nitro radicals are directly attached to the oxygenated benzene nucleus.
6. An addition salt of an amino-acid ester and a nitrated monohydric phenol characterized by nuclear-substituted nitro groups in the para-position and in one of the positions ortho to the phenolic hydroxyl radical.
7. An addition salt of a glycine ester and a nitrated monohydric phenol characterized by nuclear-substituted nitro groups in the para-position and in one of the positions ortho to the phenolic hydroxyl radical.
8. A compound having the formula

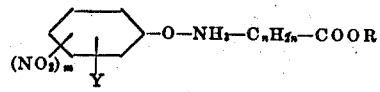

wherein $n$ is an integer, $m$ is an integer not greater than 2, R represents a hydrocarbon radical, and Y represents a radical selected from the group consisting of aryl, alkyl, cycloalkyl, aralkyl, chlorine, bromine, arylamino, and hydrogen.

9. A compound having the formula

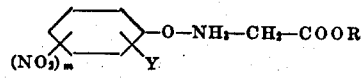

wherein $m$ is an integer not greater than 2, R represents a hydrocarbon radical, and Y represents a radical selected from the group consisting of aryl, alkyl, cycloalkyl, aralkyl, chlorine, bromine, arylamino, and hydrogen.

10. A compound having the formula

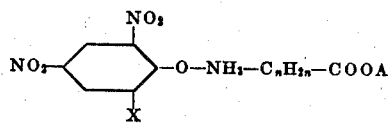

wherein $n$ is an integer, A represents a non-benzenoid hydrocarbon radical, and X is a saturated hydrocarbon radical containing at least 2 carbon atoms.

11. A compound having the formula

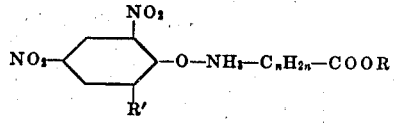

wherein $n$ is an integer, R represents a hydrocarbon radical, and R' represents a saturated hydrocarbon radical containing 6 carbon atoms.

12. A compound having the formula

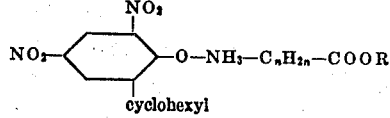

wherein $n$ is an integer, and R represents a hydrocarbon radical.

13. A compound having the formula

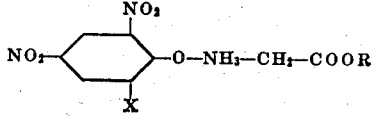

wherein R represents a hydrocarbon radical, and X represents a saturated hydrocarbon radical containing at least 2 carbon atoms.

14. A compound having the formula

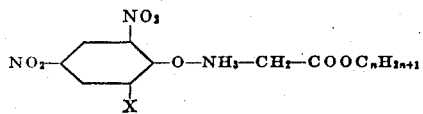

wherein $n$ is an integer, and X represents a saturated hydrocarbon radical containing at least 2 carbon atoms.

15. A compound having the formula

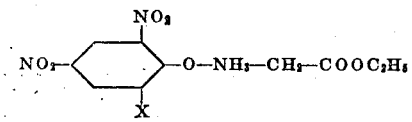

wherein X represents a saturated hydrocarbon radical containing at least 2 carbon atoms.

16. A compound having the formula

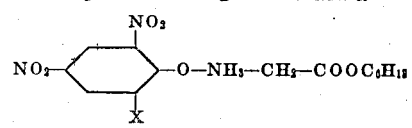

wherein X represents a saturated hydrocarbon radical containing at least 2 carbon atoms.

17. A compound having the formula

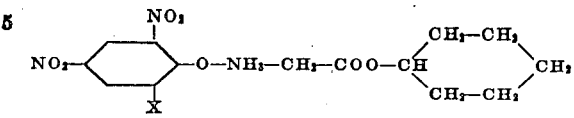

wherein X represents a saturated hydrocarbon radical containing at least 2 carbon atoms.

18. A compound having the formula

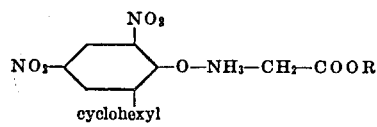

wherein R represents a hydrocarbon radical.

FRANK B. SMITH.
JOHN N. HANSEN.